United States Patent
Galstian et al.

(10) Patent No.: US 9,904,086 B2
(45) Date of Patent: Feb. 27, 2018

(54) TUNABLE LIQUID CRYSTAL OPTICAL DEVICE

(71) Applicant: LENSVECTOR INC., San Jose, CA (US)

(72) Inventors: Tigran Galstian, Quebec (CA); Jean-François Viens, Quebec (CA); Amir Tork, Quebec (CA)

(73) Assignee: LENSVECTOR INC., Sunnyvale, CA (US)

( * ) Notice: Subject to any disclaimer, the term of this patent is extended or adjusted under 35 U.S.C. 154(b) by 0 days.

(21) Appl. No.: 15/128,894

(22) PCT Filed: Dec. 17, 2014

(86) PCT No.: PCT/CA2014/051221
§ 371 (c)(1),
(2) Date: Sep. 23, 2016

(87) PCT Pub. No.: WO2015/168769
PCT Pub. Date: Nov. 12, 2015

(65) Prior Publication Data
US 2017/0160600 A1    Jun. 8, 2017

Related U.S. Application Data

(60) Provisional application No. 61/988,662, filed on May 5, 2014.

(51) Int. Cl.
*G02F 1/1333* (2006.01)
*G02F 1/1341* (2006.01)
(Continued)

(52) U.S. Cl.
CPC ........ *G02F 1/133345* (2013.01); *G02F 1/137* (2013.01); *G02F 1/1337* (2013.01);
(Continued)

(58) Field of Classification Search
CPC ............ G02F 1/134309; G02F 1/1341; G02F 1/13306; G02F 1/1337; G02F 1/137;
(Continued)

(56) References Cited

U.S. PATENT DOCUMENTS

2002/0045037 A1    4/2002  Boire et al.
2003/0197813 A1*  10/2003  Nakanishi ............... G06F 3/045
                                                                349/12
(Continued)

FOREIGN PATENT DOCUMENTS

WO    WO 2009/153764 A2    12/2009
WO    WO 2011/075834 A1     6/2011

OTHER PUBLICATIONS

International Search Report and Written Opinion issued in International Patent Application No. PCT/CA2014/051221 dated Apr. 16, 2015.

*Primary Examiner* — Edward Glick
*Assistant Examiner* — Shan Liu
(74) *Attorney, Agent, or Firm* — Arent Fox LLP

(57) ABSTRACT

A variable liquid crystal optical device for controlling the propagation of light has one or more transparent thin-film highly-resistive layer (HRL) coupled to a substrate and an electrode structure. The HRL has core layer and a cover or proximity layer, wherein the core layer material has a higher electrical conductivity and higher refractive index than the cover layer material; and wherein the core and cover layer materials have substantially the same free energies of formation of oxide. In this way, the electrode structure will be environmentally stable and responsive to an applied electrical current to generate a spatially non-uniform magnetic field.

9 Claims, 5 Drawing Sheets

(51) Int. Cl.
*G02F 1/133* (2006.01)
*G02F 1/1337* (2006.01)
*G02F 1/1343* (2006.01)
*G02F 1/137* (2006.01)

(52) U.S. Cl.
CPC ........ *G02F 1/1341* (2013.01); *G02F 1/13306* (2013.01); *G02F 1/134309* (2013.01)

(58) Field of Classification Search
CPC ........... G02F 1/133345; G02F 2201/42; G02F 1/1365; G02F 1/1368; G02F 1/13439; G02F 1/136209; G02F 1/136227; G02F 2001/136218; G02F 2001/136222; G02F 2001/136231; G02F 2001/13625; G02F 2201/122; G02F 2202/10; G02F 1/133707; G02F 2001/133738; G02F 2001/133769; G02F 2001/133776; G02F 2001/13787; G02F 1/0123; G02F 1/29; G02F 1/133526; G02F 1/13452; G02F 2001/133317; G02F 1/133615; G02F 1/133621; G02F 1/133512; G02F 2001/133607; G02F 1/292; G02F 2201/305; G02F 2203/24; G02F 1/133371; G02F 1/1347; G02F 1/13471; G02F 2203/22; G01N 27/205; G09G 3/367; G09G 2300/0495; G09G 2300/06; G09G 2300/0866; G09G 3/2944; G09G 3/2946; H01L 21/02107; H01L 21/31; H01L 21/469; H01L 27/224; H01L 27/2418; G02B 27/2214; G02B 27/225; G02B 27/26; G02B 6/0053; G02B 27/22; G02B 27/2278; G02B 3/0056; G02B 5/1828; G02B 26/0808; H04N 13/0404

USPC .. 349/138, 43, 52, 123, 33, 34, 200, 57, 15, 349/95, 201, 202
See application file for complete search history.

(56) References Cited

U.S. PATENT DOCUMENTS

| | | | |
|---|---|---|---|
| 2005/0219724 A1* | 10/2005 | Teramoto | G02B 5/282 359/883 |
| 2007/0188689 A1* | 8/2007 | Nakamura | G02F 1/133502 349/122 |
| 2009/0116097 A1* | 5/2009 | McCabe | B60R 1/12 359/267 |
| 2010/0297365 A1 | 11/2010 | Curd | |
| 2011/0109824 A1 | 5/2011 | Galstian | |
| 2012/0068145 A1* | 3/2012 | Matsuo | H01L 45/08 257/4 |
| 2012/0154916 A1* | 6/2012 | Nishimoto | G02B 1/115 359/580 |
| 2012/0236043 A1* | 9/2012 | Jung | G02B 27/2214 345/690 |
| 2012/0248445 A1* | 10/2012 | De Paiva Martins | H01L 21/0215 257/59 |
| 2012/0257131 A1 | 10/2012 | Galstian et al. | |
| 2013/0128391 A1* | 5/2013 | Fuji | B82Y 10/00 360/324.12 |
| 2013/0134415 A1* | 5/2013 | Godo | H01L 29/7869 257/43 |
| 2015/0153484 A1* | 6/2015 | Neuffer | G02B 1/041 351/159.57 |
| 2015/0179933 A1* | 6/2015 | Mathur | H01L 45/00 257/2 |

* cited by examiner

TUNABLE LIQUID CRYSTAL OPTICAL DEVICE

CROSS REFERENCE TO RELATED APPLICATION

This application is a 35 U.S.C. 371 National Phase of PCT Application No. PCT/CA2014/051221 dated Dec. 17, 2014, which claims priority of U.S. provisional patent application Ser. No. 61/988,862, filed May 5, 2014. The disclosure of these prior applications are hereby incorporated in their entirety by reference.

TECHNICAL FIELD

The present application relates to liquid crystal optical devices.

BACKGROUND

In International PCT patent application publication WO2009/153764 published on 23 Dec. 2009 and commonly owned by the present applicant, there is described a tunable liquid crystal optical device, such as a lens, that has a liquid crystal electrical control field electrode that uses a weakly conductive or highly resistive material in combination with the electrode and cell geometry that allows for tuning of the optical property of the device using a frequency of the control signal. For example, a hole patterned electrode can be used on one side of the liquid crystal cell, while a planar electrode can be used on an opposed side of the liquid crystal cell. A layer of the highly resistive material or highly resistive layer (HRL) can be provided near the hole patterned electrode.

In the absence of the HRL, the electric field would be concentrated at the periphery of the lens aperture due to the geometry, for example, a lens aperture can be about 3 mm with a cell thickness of about 50 microns. With the spacing between the electrodes about 60 times smaller than the diameter, it will be understood that the electric field cannot spread out to control the central part of the lens. Also, the electric field lines are not parallel to the optical axis of such a lens, and thus asymmetry about the optical axis of the liquid crystal arises. The inclusion of such an HRL is to cause the electric field at the hole patterned electrode to appear across the entire aperture with a gradual decay in strength from the periphery to the center optical axis. The electric field lines are also essentially parallel to the optical axis.

SUMMARY

It has been discovered that such HRLs can be a challenge to manufacture and employ while obtaining desired properties. One problem is the chemical stability of the substance used. Titanium oxide can function efficiently in the HRL, however, a change in its oxidation state by exposure to other oxygen-containing substances can change its conductive properties. In addition, the HRL being in the optical path of the lens, it must introduce as small as possible optical losses, for example, by index matching.

It has been discovered that both stabilization of materials properties, and optical index-matching, of the HRL can be done by encapsulating the HRL within a suitable material having suitable oxygen barrier and index of refraction properties.

In some embodiments, there is provided a variable liquid crystal optical device for controlling the propagation of light comprising a substrate, an electrode structure coupled to said substrate, at least one electrical contact interconnecting said electrode structure, at least one transparent thin-film HRL layer coupled to said substrate and said electrode structure. The HRL thin-film layer comprises at least one core layer, and at least one cover or proximity layer, wherein the core layer material has a higher electrical conductivity and higher refractive index than the cover layer material; and wherein the core and cover layer materials have substantially the same free energies of formation of oxide. In this way, the electrode structure will be environmentally stable and responsive to an applied electrical current to generate a spatially non-uniform magnetic field.

In accordance with some embodiments, there is provided a method for manufacturing a liquid crystal optical device comprising an HRL made of a 5-layer stack consisting of one titanium oxide $TiO_x$ core layer material (with x between 1.4 and 1.8), two immediate neighboring $Ta_2O_5$ proximity layer materials surrounding the $TiO_x$ core layer material, and two $Al_2O_3$ proximity layer materials surrounding the two $Ta_2O_5$ proximity layer materials. The HRL is deposited by Electron Beam Physical Vapor Deposition (EBPVD) on a 100 micron thick $SiO_2$ substrate, and provides a stable electrical sheet resistance Rs in the range from 1 M$\Omega$/□ to 100 M$\Omega$/□ with low optical reflection loss in visible light at the wavelength of 500 nm.

In accordance with some embodiments, there is provided a method for manufacturing a liquid crystal optical device comprising an HRL made of a 5-layer stack consisting of one titanium oxide $TiO_x$ core layer material (with x between 1.4 and 1.8), two immediate neighboring $Ta_2O_5$ proximity layer materials surrounding the $TiO_x$ core layer material, and two $Al_2O_3$ proximity layer materials surrounding the two $Ta_2O_5$ proximity layer materials. The HRL is deposited by Sputter Deposition on a 100 micron thick $SiO_2$ substrate, and provides a stable electrical sheet resistance Rs in the range from 1 M$\Omega$/□ to 100 M$\Omega$/□ with low optical reflection loss in visible light at the wavelength of 500 nm.

In accordance with some embodiments, there is provided a gradient-index liquid crystal optical device comprising transparent substrates defining a gap between inner sides of the substrates, a liquid crystal material filling the gap, an alignment layer covering said substrates for orienting the liquid crystal material, electrodes supported by the inner sides of the substrates and structured to create a spatially non-uniform electric field in the gap, a highly resistive layer having a core weakly conductive material with an index of refraction higher than an index of refraction of the substrates and encapsulated by one or more layers of a proximity material having insulating properties and an index of refraction between the index of refraction of the weakly conductive material and the index of refraction of the substrates, the proximity material having substantially a same free energy of formation of oxide as the weakly conductive material.

BRIEF DESCRIPTION OF THE DRAWINGS

The invention will be better understood by way of the following detailed description of embodiments of the invention with reference to the appended drawings, in which.

DETAILED DESCRIPTION

Figure 1:
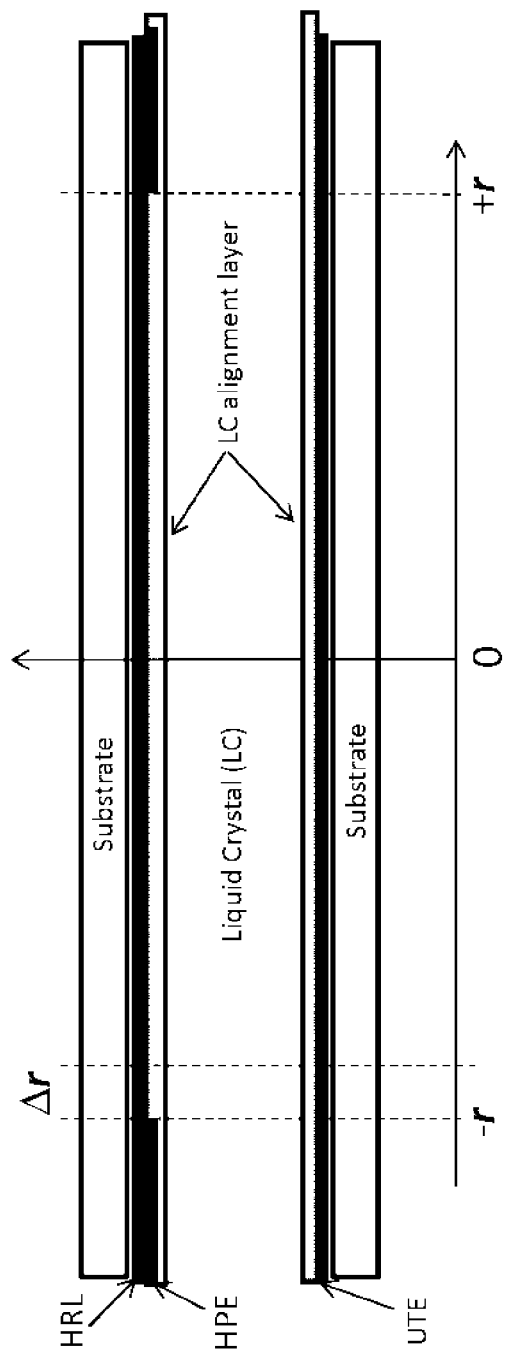
FIG. 1 is a schematic illustration of a cross-section of tunable liquid crystal lens using a highly resistive layer (HRL) according to the prior art.

With reference to FIG. 1, a conventional liquid crystal tunable lens is illustrated in cross-section about an optical axis (passing through the r=0 point). Such a lens can be 2 to 3 mm in diameter, and can have a liquid crystal layer between 50 to 150 microns in thickness, placed between alignment layers supported by substrates. Details of such a design are known from the state of the art, as for example in A. F. Naumov et al. Liquid-crystal adaptive lenses with modal control, Optics Letters, Vol. 23, No. 13/Jul. 1, 1998, and in the already-mentioned WO2009/153764. Typically, such optical devices are provided with two layers of liquid crystal (with orthogonally molecular alignments) to act on both linear polarizations of light. The device can be a lens of any desired shape, circular or otherwise, and it can be a beam steering device (prism, etc.).

In WO2009/153764, a somewhat different configuration was also described, namely that the HRL be provided on the outer side of the substrate between two LC cells, each one acting on a single polarization of light. This has the advantage that the HRL is not exposed to the alignment layer and liquid crystal that can contribute to oxidation of the HRL material. The embodiment of FIG. 1 has the advantage that by bringing the hole patterned electrode (HPE) closer to the uniform transparent (UTE), the voltage used can be reduced. The term HPE is intended to include electrodes with gaps, such as strip electrodes having a gap therebetween as may be used for a beam steering device, and thus not only electrodes having a hole and a surrounding electrode or plurality of electrode segments.

The HRL in FIG. 1 is shown as being placed on one of the two substrates with the HPE, typically a metal or indium tin oxide (ITO) deposited layer, on top. An alignment layer, typically a rubbed polyimide layer about 30 nm thick, is placed over the HRL and HPE. A UTE, made of ITO, is provided on the opposed substrate, with an alignment layer placed over the UTE. An electrical signal (difference of potentials) applied to the HPE and the UTE will create an electric field that spreads over the entire aperture, and with a spatial distribution that can be controlled by frequency (and also voltage), as is known in the art.

The HRL provides "not infinitely high" resistance (at the order of MΩ/☐), which, combined with the liquid crystal (LC) and the uniform transparent electrode (UTE), creates an effective RC circuit at every slice $\Delta r$. Thus, the electric potential is reduced "softly" when propagating from the border of the HPE (+r and −r) towards the center of the lens r(0). This allows to build low voltage controlled LC lenses with relatively large clear aperture (CA=2×r≈2 mm).

In addition to dynamic focusing, such elements (substrate+HRL+LC alignment layer) may be used (in combination with various electrodes) also for light steering, and other LC devices.

In some cases, the HRL is made out of titanium oxide films (TiOx), which are deposited directly on the substrate and thus are facing from the second (opposite) side a liquid crystal alignment layer (usually Polyimide, GeO or other material). In other cases, the HRL is made out of zinc oxide films (ZnO), which are deposited on $SiO_2$ layer and are also facing (from the opposite side) the liquid crystal alignment layer. In other cases, the HRL is made out of zinc sulfide films (ZnS), which are deposited on $SiO_2$ layer and are also facing (from the opposite side) the liquid crystal alignment layer. In other cases, the HRL is made out of tin oxide films ($SnO_2$), which are deposited on $SiO_2$ layer and are also facing (from the opposite side) the liquid crystal alignment layer. In other cases, the HRL is made out of antimony tin oxide films (Sb—Sn—O), which are deposited on $SiO_2$ layer and are also facing (from the opposite side) the liquid crystal alignment layer. Other material compositions may also be used to build HRLs.

Applicant has found that that HRLs, used on those implementations from a practical point of view have two difficulties, namely they drastically reduce the optical transmission of the lens, and they are environmentally unstable with varying temperature, varying UV illumination, and varying humidity, etc.

The absorption and the reflection of HRLs can be a problem because typically they are made out of semiconductors, or amorphous semiconductors, with bandgap energies in the blue spectral range (Eg>3.5 eV) with very high refractive index values, in the order of $n_{HRL}$=1.8 to 3.6, versus $n_g$=1.5 of glass or of LC materials ($n_{LC}$=about 1.5 to 1.7). The high refractive index of those layers generates high reflection losses. As a result, given the low light sensitivity of modern image sensors' pixels (with continuously shrinking sizes, current CMOS sensors having pixels of very small size=1.1 micrometers), the acquisition rate of images slows down. In some cases, for example, this slow rate combined with hand shake of mobile devices reduces dramatically the image quality.

Well known solutions exist in the prior art to reduce the light reflection problems by adding multiple dielectric layers of specific thickness d and refractive index n. Layer thicknesses are chosen to produce destructive interference in the beams reflected from the interfaces, and constructive interference in the corresponding transmitted beams, resulting in reflection loss of less than 1% at a specific wavelength λ. For example, anti-reflection layers consisting of transparent thin film structures with alternating layers of contrasting refractive index, having thicknesses of d=λ/4n, or an odd-integer multiple thereof.

However, Applicant's experiments show that, while the addition of such layers may indeed reduce the reflection losses, the environmental stability of the sheet resistance value Rs of the obtained stacks is still a very serious problem. Indeed, the problem of such stability is related to the difficulties in controlling the lens' performance, since the properties of the HRL, mainly its electrical sheet resistance Rs, may change over time as a result of the progressive chemical oxidation, or progressive chemical reduction, of the HRL by the immediate neighboring layers. This can result in a complete loss of control of Rs with time under varying environmental conditions (temperature, UV illumination, humidity) beyond acceptable engineering tolerance levels.

Figure 2:
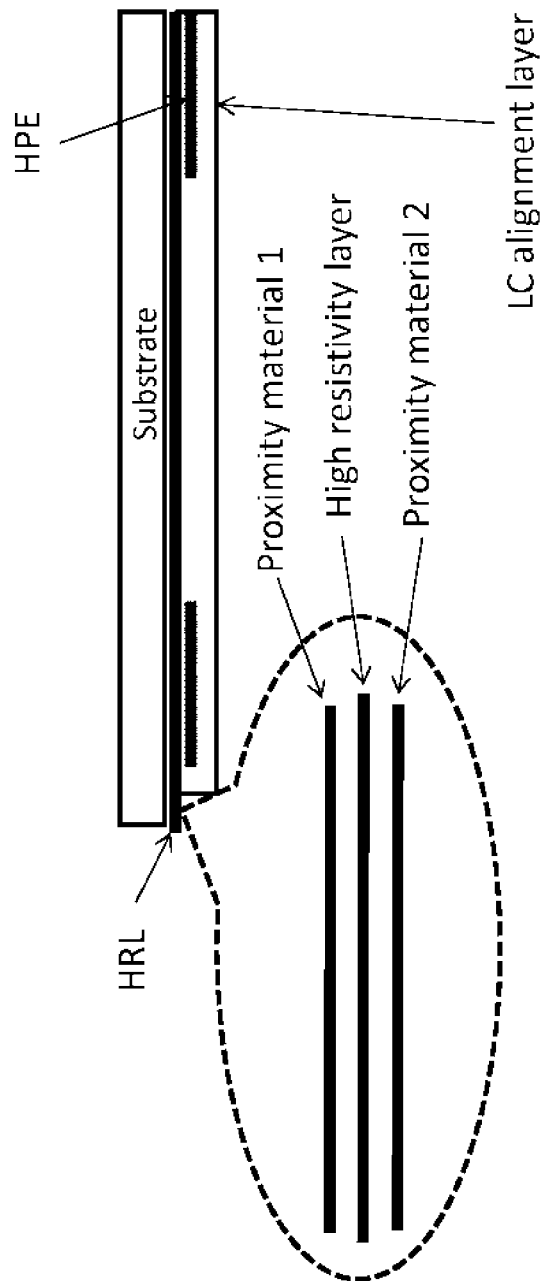
FIG. 2 is a schematic illustration of a cross-section of top cell wall of a tunable liquid crystal lens using a highly resistive layer (HRL) according to a first embodiment.

Referring now to FIG. 2, a partial view is shown illustrating the composition of the HRL according to one embodiment. Applicant's investigations show that the oxidation kinetics of the HRL needs to be stabilized when adding multiple layers to ensure that its sheet resistance values remains stable over time at a desired value in the range from Rs=1 MΩ/☐ to 100 MΩ/☐. In this case, the role of the immediate neighboring (proximity) layer to the HRL is important. Applicant proposes to choose for those immediate neighboring proximity layers very specific material compositions, which have oxidation enthalpy values similar (or close) to those of the core layer material of the HRL. This choice of immediate neighboring proximity layer materials, chosen according to similarities in oxidation enthalpy values, reduces considerably the rate of cross-oxidation or cross-reduction of the core layer material, and provides a diffusion barrier against oxygen, to keep stable the desired oxidation degree, stoichiometry, morphology, and thus Rs values of the HRL (in bulk and on its interfaces). The HRL in the present embodiment thus has a core layer material having a higher electrical conductivity and higher refractive index than the proximity material, and the core layer material and proximity layer materials have substantially the same free energies of formation of oxide.

As known in the art of thermodynamics, the free energies of formation of oxides, in kilojoules per mole of $O_2$, can be determined using the Ellingham diagrams for a variety of metal-oxide materials at specific temperatures. The position of the line for a given reaction on the Ellingham diagram shows the stability of the oxide as a function of temperature. Reactions closer to the top of the diagram are the most "noble" metals (for example, gold and platinum), and their oxides are unstable and easily reduced. As we move down toward the bottom of the diagram, the metals become progressively more reactive and their oxides become harder to reduce. Thus stable dielectric metal-oxides are located toward the bottom of the diagram at relatively large negative values of free energies of formation of oxides. The enthalpy of oxidation ($\Delta H$) is a measure of the actual energy that is liberated when the reaction occurs (the "heat of reaction"). If it is negative, then the reaction gives off energy, while if it is positive the reaction requires energy. The HRL of the present embodiment consists of metal oxides such that their environmental stability relates to their relatively large negative values of free energies of formation of oxides $\Delta G$, such as less than −700 kilojoules per mole $O_2$ at room temperature, and substantially the same enthalpy of formation of oxide $\Delta H$ for both the core layer material and immediate neighboring (proximity) layer materials of the HRL stack, within a difference of $\Delta H$ of less than 100 kilojoules per mole $O_2$ over a wide range of temperature from −40° C. to +300° C.

It will be appreciated that the choice of the proximity layer materials must be defined once the core layer material of the HRL is defined. For example, for core layer Titanium Oxide materials, such as $Ti_3O_5$, or $TiO_x$ (with x~1.6), a good choice of immediate neighboring (proximity) layer material can be $Ta_2O_5$. These materials have a free energy of formation of oxides of about $\Delta G$=−750 kJ per mole $O_2$ at room temperature, and substantially the same enthalpy of formation of oxide $\Delta H$ within a difference of less than 100 kJ per mole $O_2$ over a wide range of temperature from −40° C. to +300° C. As illustrated in FIG. 2, the core layer material $Ti_3O_5$ or $TiO_x$ can be placed between layers of $Ta_2O_5$ such that low optical reflectivity and good oxidation stability are both provided, especially when layer thicknesses d are chosen for anti-reflection properties at a specific wavelength $\lambda$, $d=\lambda/4n$, with n=2.4 and 2.1, respectively. It will be appreciated that the proximity layer material need not be the same material on both sides of the core layer material.

Alternatively, it will be appreciated that, for an HRL core layer material made of Titanium Oxide, such as $Ti_3O_5$, or $TiO_x$ (with x~1.6), a good choice of proximity layer material can be $SiO_2$. These materials have a free energy of formation of oxides of about $\Delta G$=−800 kJ per mole $O_2$ at room temperature, and substantially the same enthalpy of formation of oxide $\Delta H$ within a difference of less than 50 kJ per mole $O_2$ over a wide range of temperature from −40° C. to +300° C. As illustrated in FIG. 2, the core layer material $Ti_3O_5$ or $TiO_x$ can be placed between layers of $SiO_2$ such that low optical reflectivity and good oxidation stability are both provided, especially when layer thicknesses d are chosen for anti-reflection properties at a specific wavelength $\lambda$, $d=\lambda/4n$, with n=2.4 and 1.45, respectively. It will be appreciated that the proximity layer material need not be the same material on both sides of the core layer material.

Alternatively, it will be appreciated that, for a HRL core layer material made of Vanadium Oxide, such as $V_2O_3$, a good choice of proximity layer materials can be $Ta_2O_5$. Both materials have a free energy of formation of oxides of about $\Delta G$=−750 kJ per mole $O_2$ at room temperature, and substantially the same enthalpy of formation of oxide $\Delta H$ within a difference of less than 50 kJ per mole $O_2$ over a wide range of temperature from −40° C. to +300° C. As illustrated in FIG. 2, the core layer material $V_2O_3$ can be placed between layers of $Ta_2O_5$ such that low optical reflectivity and good oxidation stability are both provided, especially when layer thicknesses d are chosen for anti-reflection properties at a specific wavelength $\lambda$, $d=\lambda/4n$. It will be appreciated that the proximity layer material need not be the same material on both sides of the core layer material.

Alternatively, it will be appreciated that, for a HRL core layer material made of Vanadium Oxide, such as $V_2O_3$, a good choice of proximity layer materials can be $Nb_2O_5$. Both materials have a free energy of formation of oxides of about $\Delta G$=−750 kJ per mole $O_2$ at room temperature, and substantially the same enthalpy of formation of oxide $\Delta H$ within a difference of less than 50 kJ per mole $O_2$ over a wide range of temperature from −40° C. to +300° C. As illustrated in FIG. 2, the core layer material $V_2O_3$ can be placed between layers of $Nb_2O_5$ such that low optical reflectivity and good oxidation stability are both provided, especially when layer thicknesses d are chosen for anti-reflection properties at a specific wavelength $\lambda$, $d=\lambda/4n$. It will be appreciated that the proximity layer material need not be the same material on both sides of the core layer material.

Alternatively, it will be appreciated that, for a HRL core layer material made of Zirconium Oxide, such as $ZrO_2$, a good choice of proximity layer materials can be $Al_2O_3$. Both materials have a free energy of formation of oxides of about $\Delta G$=−1050 kJ per mole $O_2$ at room temperature, and substantially the same enthalpy of formation of oxide $\Delta H$ within a difference of less than 50 kJ per mole $O_2$ over a wide range of temperature from −40° C. to +300° C. As illustrated in FIG. 2, the core layer material $ZrO_2$ can be placed between layers of $Al_2O_3$ such that low optical reflectivity and good oxidation stability are both provided, especially when layer thicknesses d are chosen for anti-reflection properties at a specific wavelength $\lambda$, $d=\lambda/4n$. It will be appreciated that the proximity layer material need not be the same material on both sides of the core layer material.

It will be appreciated that the HRL of the present embodiment is not limited to the abovementioned core and proximity layer materials. It will be appreciated that the HRL of the present embodiment may comprise core and proximity layer materials made of a variety of different metal-oxide material compounds meeting the abovementioned conditions on free energy of formation of oxides and optical transparency. Also, it will be appreciated that other proximity layer materials can be stacked over the abovementioned HRLs, thus providing further diffusion barrier capabilities for the HRL against the environment, especially against oxygen diffusion. In one example of the present embodiment, illustrated in FIG. 4, a layer of $Al_2O_3$ (proximity layer material #2) may be stacked over the immediate neighboring proximity layer of $Ta_2O_5$ (proximity layer material #1), wherein the respective layer thicknesses d are chosen for anti-reflection properties at a specific wavelength $\lambda$, such that, for example, $d=\lambda/4n$, or an odd-integer multiple thereof.

Figure 4:
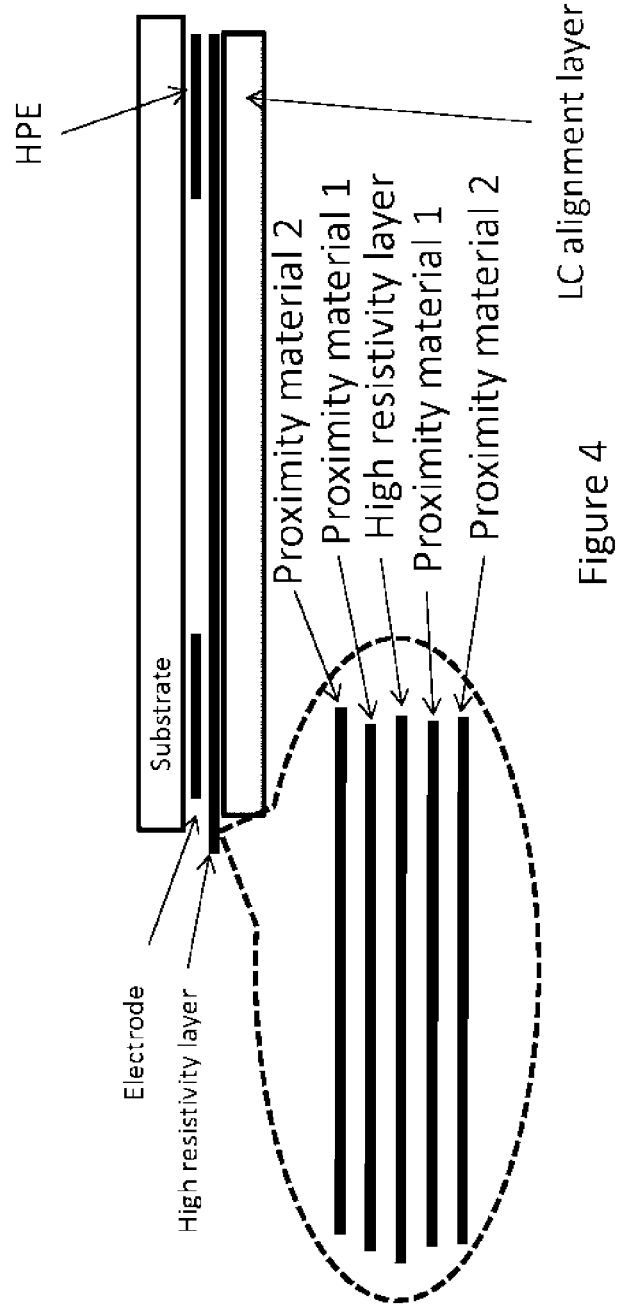
FIG. 4 is a schematic illustration of a cross-section of top cell wall of a tunable liquid crystal optical device (e.g. a lens or beam steering device) using a highly resistive layer (HRL) according to a third embodiment.

In one embodiment of the present application, illustrated in FIG. 4, the HRL is made of a 5-layer stack consisting of one titanium oxide $Ti_3O_5$ core layer material ($Ti_3O_5$ thickness of about 50 nm), two immediate neighboring $Ta_2O_5$ proximity layer materials surrounding the $Ti_3O_5$ core layer material ($Ta_2O_5$ thickness of about 60 nm), and two $Al_2O_3$ proximity layer materials surrounding the two $Ta_2O_5$ proximity layer materials ($Al_2O_3$ thickness of about 75 nm).

In another embodiment of the present application, illustrated in FIG. 4, the HRL is made of a 5-layer stack consisting of one titanium oxide $TiO_x$ core layer material with x between 1.4 and 1.8 ($TiO_x$ thickness of about 50 nm), two immediate neighboring $Ta_2O_5$ proximity layer materials surrounding the $TiO_x$ core layer material ($Ta_2O_5$ thickness of about 60 nm), and two $Al_2O_3$ proximity layer materials surrounding the two $Ta_2O_5$ proximity layer materials ($Al_2O_3$ thickness of about 75 nm).

In another embodiment of the present application, the HRL is made of a 4-layer stack consisting of one titanium oxide $Ti_3O_5$ core layer material ($Ti_3O_5$ thickness of about 50 nm), two immediate neighboring $Ta_2O_5$ proximity layer materials surrounding the $Ti_3O_5$ core layer material ($Ta_2O_5$ thickness of about 60 nm), and one $Al_2O_3$ proximity layer materials surrounding one $Ta_2O_5$ proximity layer material ($Al_2O_3$ thickness of about 75 nm).

Figure 3:
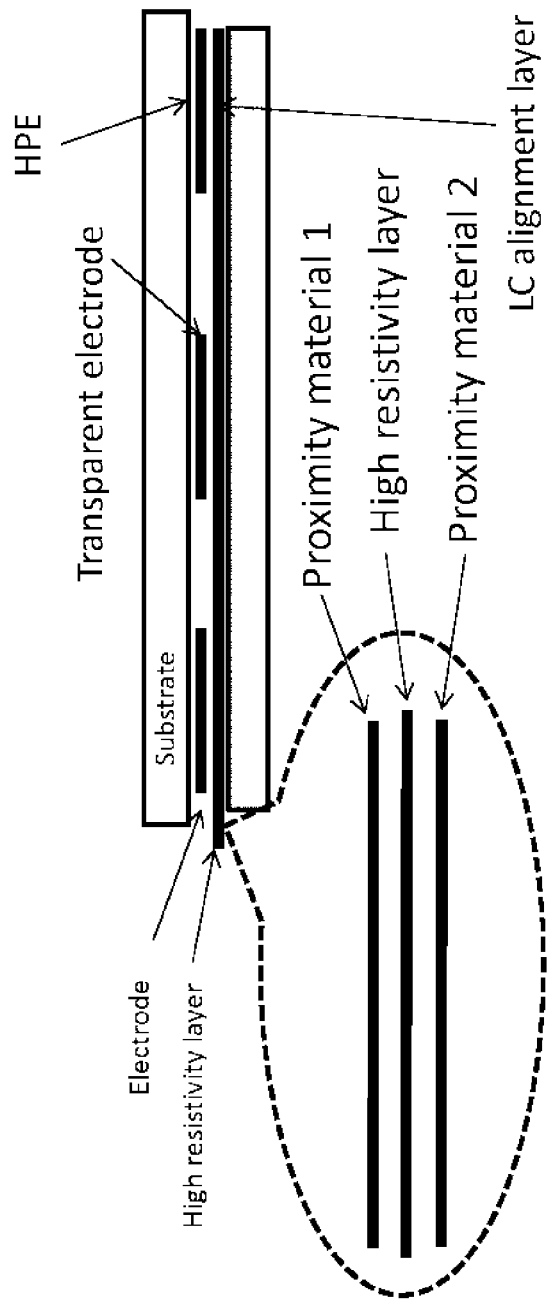
FIG. 3 is a schematic illustration of a cross-section of top cell wall of a tunable liquid crystal lens using a highly resistive layer (HRL) according to a second embodiment.

In another embodiment, the HRL is provided on the control electrode deposited on the substrate, and can be called an "inverted" electrode position. This is shown in FIG. 3. Such a solution may be particularly interesting in the case of using discrete (non uniform over the whole aperture) transparent electrodes which are in the optical path of the device. For example, the disc shaped (see below the corresponding cross section), or doughnut shaped or ring shaped electrodes. This inverted arrangement with those additional active or passive electrodes can be used to "soften" the electric field variations in the proximity of the borders of those discrete electrodes (labelled "transparent electrode" in FIG. 3) or to help extend the electric field into the middle of the aperture.

In another embodiment, the HRL can include additional layers and different positions of those layers as illustrated in FIG. 4. In this embodiment, there are two proximity materials on each side of the highly resistive material to help with both index matching and barrier protection. The proximity material can be different on opposed sides of the highly resistive material, and there can be more proximity material layers one side than the other, as described.

In accordance with some embodiments, there is provided a method for manufacturing a liquid crystal optical device comprising an HRL made of a 5-layer stack consisting of one titanium oxide $TiO_x$ core layer material with x between 1.4 and 1.8 ($TiO_x$ thickness of about 50 nm), two immediate neighboring $Ta_2O_5$ proximity layer materials surrounding the $TiO_x$ core layer material ($Ta_2O_5$ thickness of about 60 nm), and two $Al_2O_3$ proximity layer materials surrounding the two $Ta_2O_5$ proximity layer materials ($Al_2O_3$ thickness of about 75 nm). The HRL is deposited by Electron Beam Physical Vapor Deposition (EBPVD) on a 100 micron thick $SiO_2$ substrate, and provides a stable electrical sheet resistance Rs in the range from 1 M$\Omega$/□ to 100 M$\Omega$/□ with low optical reflection loss in visible light at the wavelength of 500 nm. EBPVD is a form of physical vapor deposition in which a target anode is bombarded with an electron beam given off by a charged tungsten filament under high vacuum. The electron beam causes atoms from the target ($TiO_x$, $Ta_2O_5$, or $Al_2O_3$) to transform into the gaseous phase. These atoms then precipitate into solid layer form onto the substrate placed above the target. In an EBPVD system, the deposition chamber must be evacuated to a base pressure of at least $1\times10^{-5}$ Torr using a diffusion or a turbo vacuum pump to allow passage of electrons from the electron gun to the evaporation material ($TiO_x$, $Ta_2O_5$, or $Al_2O_3$) which can be initially in the form of granules. These refractory oxides undergo fragmentation during their evaporation by the electron beam, resulting in a stoichiometry that is different from the initial material. For example, alumina, when evaporated by electron beam, dissociates into aluminum, $AlO_3$ and $Al_2O$. These compounds can be deposited on the substrate either by reactive evaporation or by co-evaporation. In the reactive evaporation process, the initial material is evaporated by the electron beam. The vapors are carried by the reactive gas, which is oxygen in case of metal oxides, assisted or not by an argon plasma. When the thermodynamic conditions are met, the vapors react with the gas in the vicinity of the substrate to form films of desired oxidation levels.

In accordance with the method for manufacturing a liquid crystal optical device comprising an HRL and a $SiO_2$ substrate, the 5-layer HRL stack is deposited by oxygen/argon plasma-assisted reactive EBPVD on a $SiO_2$ substrate heated to 300° C. The evaporation starts with the EBPVD evaporation a 75 nm-thick $Al_2O_3$ proximity layer material using granules of $Al_2O_3$ material in a Molybdenum crucible, followed by the EBPVD evaporation of a 60 nm-thick $Ta_2O_5$ proximity layer material using granules of $Ta_2O_5$ material in a Molybdenum crucible, followed by the EBPVD evaporation of a 50 nm-thick $TiO_x$ (with x~1.6) core layer material using granules of $Ti_3O_5$ material in a Molybdenum crucible, followed by the EBPVD evaporation of a 60 nm-thick $Ta_2O_5$ proximity layer material using granules of $Ta_2O_5$ material in a Molybdenum crucible, and followed by the EBPVD evaporation a 75 nm-thick $Al_2O_3$ proximity layer material using granules of $Al_2O_3$ material in a Molybdenum crucible. The oxygen flow is adjusted to 20 sccm, 50 sccm, 7 sccm, 50 sccm, and 20 sccm, respectively, to obtain the desired oxidation levels for the layer materials, i.e. stoichiometric $Ta_2O_5$ and $Al_2O_3$ for the proximity layers, and non-stoichiometric $TiO_x$ (with x~1.6, or between 1.4 and 1.8) for the core layer. The temperature of the substrate must be monitored and controlled when needed, for example, to be on the order or between 250° C. and 350° C. All process parameters of the EBPVD deposition must be carefully controlled and automated. It will be appreciated that the method for manufacturing HRL of the present embodiment is not limited to the abovementioned EBPVD oxygen flow levels or substrate temperature, as they can be adjusted according to the size of the EBPVD deposition system, discharge power of the plasma gun, and the desired value of sheet resistance Rs in the range from 1 MΩ/□ to 100 MΩ/□ from the non-stoichiometry of $TiO_x$ with x adjusted between 1.4 and 1.8, respectively.

In accordance with some embodiments, there is provided a method for manufacturing a liquid crystal optical device comprising an HRL made of a 5-layer stack consisting of one titanium oxide $TiO_x$ core layer material with x between 1.4 and 1.8 ($TiO_x$ thickness of about 50 nm), two immediate neighboring $Ta_2O_5$ proximity layer materials surrounding the $TiO_x$ core layer material ($Ta_2O_5$ thickness of about 60 nm), and two $Al_2O_3$ proximity layer materials surrounding the two $Ta_2O_5$ proximity layer materials ($Al_2O_3$ thickness of about 75 nm). The HRL is deposited by Sputter Deposition on a 100 micron thick $SiO_2$ substrate, and provides a stable electrical sheet resistance Rs in the range from 1 MΩ/□ to 100 MΩ/□ with low optical reflection loss in visible light at the wavelength of 500 nm. Sputter deposition is a physical vapor deposition method of depositing thin films by sputtering. The sputter deposition process involves ejecting material from a metal target (such as Ti, Ta, or Al) or from a partially oxidized "oxidic" metal target (such as $Ti_xO$, $Ta_xO$, or $Al_xO$) onto the substrate. Sputtered atoms ejected from the target have a wide energy distribution, typically up to tens of eV. In a sputter system, the deposition chamber must be evacuated to a base pressure of at least $1\times10^{-5}$ Torr, then the chamber is partially filled with the sputtering gas, often an inert gas such as argon. When the argon gas reaches the specified process pressure, on the order of 0.3 Pascal, an argon plasma is sparked in the chamber using a Magnetron device in bipolar pulse or AC mode, wherein the metal targets act as the cathode/anode. In reactive sputtering, $O_2$ reactive gas is introduced into the argon plasma. Oxygen is utilized for layer oxidation, as deposited film is oxidized by chemical reaction between the sputtered material and the oxygen gas. The composition, or oxidation level, of the film can be controlled by varying the relative partial pressures of the inert and reactive gases in the deposition chamber, as well as by varying the plasma discharge power. The relative partial pressures of Ar and $O_2$ gases are adjusted, for example, in a ratio 90/10, to carefully adjust the sheet resistance range of the HRL titanium oxide layer.

In accordance with the method for manufacturing a liquid crystal optical device comprising an HRL and a $SiO_2$ substrate, the 5-layer HRL stack is deposited by oxygen/argon plasma-assisted reactive sputtering on a $SiO_2$ substrate heated to 150° C. The sputtering starts with the sputter evaporation a 75 nm-thick $Al_2O_3$ proximity layer material using two AC mode metallic Aluminium targets, followed by the sputter evaporation of a 60 nm-thick $Ta_2O_5$ proximity layer material using two AC mode metallic Tantalum targets, followed by the sputter evaporation of a 50 nm-thick $TiO_x$ (with x~1.6) core layer material using two AC mode metallic Titanium targets, followed by the sputter evaporation of a 60 nm-thick $Ta_2O_5$ proximity layer material using two AC mode metallic Tantalum targets, and followed by the sputter evaporation a 75 nm-thick $Al_2O_3$ proximity layer material using two AC mode metallic Aluminium targets. Magnetron sputtering in bipolar pulse or AC mode may be used for the sputtering process. The relative partial pressures of Ar and $O_2$ gases are adjusted in a ratio of about 90/10. The oxygen flow is adjusted to 20 sccm, 50 sccm, 7 sccm, 50 sccm, and 20 sccm, respectively, to obtain the desired oxidation levels for the layer materials, i.e. stoichiometric $Ta_2O_5$ and $Al_2O_3$ for the proximity layers, and non-stoichiometric $TiO_x$ (with x~1.6, or between 1.4 and 1.8) for the core layer. The temperature of the substrate must be monitored and controlled when needed, for example, to be on the order or between 100° C. and 150° C. All process parameters of the sputtering deposition must be carefully controlled and automated. It will be appreciated that the method for manufacturing HRL of the present embodiment is not limited to the abovementioned sputter oxygen flow levels, sputter AC mode, or substrate temperature, as they can be adjusted according to the size of the sputter deposition system, discharge power of the plasma, and the desired value of sheet resistance Rs in the range from 1 MΩ/□ to 100 MΩ/□ from the non-stoichiometry of $TiO_x$ with x adjusted between 1.4 and 1.8, respectively.

The HRL, for example using antimony tin oxide films (Sb—Sn—O) as the core layer, can also be prepared using a pyrolysis (sol gel) process. For example, Sb doped tin oxide ($SbSnO_x$) is synthesized by pyrolysis process to form a High Dielectric Constant Layer (HDLC) performing the same functions as "weakly conductive" or "high sheet resistance" layer in the All Flat Tunable Liquid Crystal Lens (ALF-TLCL) geometry. The original material is tin chloride ($SnCl_4 \cdot 5H_2O$), then transformed to tin oxide ($SnO_2$) by pyrolysis process at high temperature (e.g. around 500° C.). To increase the conductivity of the metal oxide, antimony (Sb) at various concentrations can be also doped with $SnO_2$. In this embodiment, the effect of 0.5 and 1% of Sb doped $SnO_2$ is shown.

The chemistry of this process involves hydrolysis and poly condensation reaction. Colloidal suspensions of $SnO_2$ can be obtained by controlling the concentration of the chemicals, pH of the solution and residual ion elimination. It is noted that in the classic wet route, the particles tend to grow by a coarsening process in order to minimize the surface free energy. But it is possible to reduce this effect by the adding of an amine and surfactant during the synthesis which decreases the surface free energy of the colloidal particles. These additives promote the formation of powders composed of very small primary particles formed by a crystallite of 10 Å and exhibit good re-dispersion properties.

$SnO_2$ sol was prepared from ethanolic $SnCl_4.5H_2O$ mixed with 2% caprolactam and Triton (as surfactant) in isopropanol and precipitated by the addition of ammonia solution (at pH=11). The precipitate was refluxed for 2 h at 80° C. and reminiscent Cl-ions were eliminated by centrifugation (3 min at 17,000 rpm) and washed by deionized (DI) water (3 times) and the last two times with ethanol. The resulting alcoholic paste of ultra-fine powder was dried at 40° C. Then, the powder is dissolved in ethylamine solution (2% in volume). The resulting yellow and transparent stable colloidal solution is used for dip coating process. The coated film is annealed for 30 min at 500° C.

The main reaction that leads to the formation of $SnO_2$ thin films is:

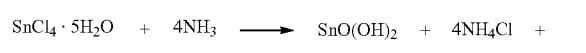
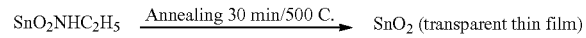

EXAMPLE

SbSnOx from Sb:SnO(OH)2
Sb 0.5% mol in precursor solution nanoparticles (5%) redispersed in Water+ethylamine(2%)
1 layer deposited by dip coating at 45 mm/mn
Annealing 500° C.
Slow heating and cooling (about 5° C./mn)

|  | Side 1 | | | Side 2 | | | difference |
| --- | --- | --- | --- | --- | --- | --- | --- |
| 1 kHz | R (Mohm) | Q | Rs (Mohm/sq) | R (Mohm) | Q | Rs (Mohm/sq) | side 1/side 2 (%) |
| Point 1 | 81.5 | −1.3 | 407.5 | 84 | −1 | 420 | 2.98 |
| Point 2 | 76.7 | −1.8 | 383.5 | 83.6 | −1.2 | 418 | 8.25 |
| Point 3 | 97.6 | −1.4 | 488 | 99.6 | −1.2 | 498 | 2.01 |
| Point 4 | 93.2 | −1.3 | 466 | 87 | −1.2 | 435 | 7.13 |

It will be appreciated that the HRL as described above, with its sheet resistance Rs in the range from 1 MΩ/sq to 100 MΩ/sq, is stable over time with respect to temperature cycles (from −40° C. to +300° C.), to humidity cycles (from 0% to 100% relative humidity), and to ultraviolet (UV) cycles (several tens of Joules per cm2) within relative changes of Rs of a few percent, thus accommodating most engineering tolerance requirements.

Figure 5:
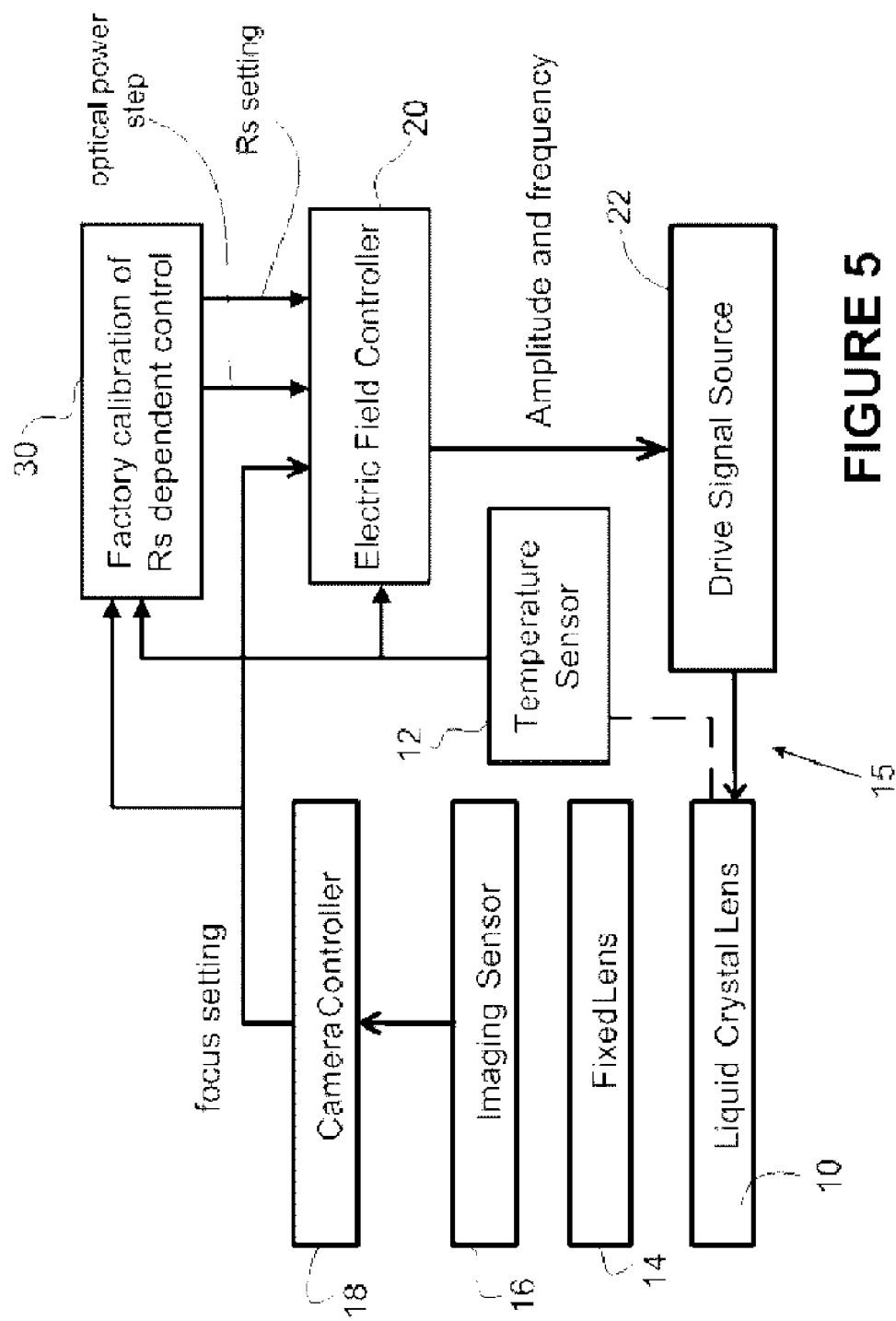
FIG. 5 is a schematic block diagram of a camera using the tunable liquid crystal lens according to one embodiment, in which the HRL stability allows for control of the lens with a one-time calibration of the resistivity of the HRL.

The optical device itself may also have temperature dependent operational parameters. As illustrated in FIG. 5, a tunable liquid crystal lens 10 is provided with the HRL as part of a camera 15. The lens 10 is arranged with one or more fixed lenses 14, as is known in the art, to provide an image onto an image sensor 16 with variable focus. The image is processed by a camera controller 18 to determine a focus score, and the controller, in operation signals to a controller 20 what focus setting it desires, or in the case of optical image stabilization (OIS), the image offset it desires, namely the change in the position of the optical axis. OIS in the context of a liquid crystal lens camera is known in the art from PCT patent application publication number WO2011/075834 dated 30 Jun. 2011.

The electric field controller 20 is tasked with determining how to change the electrical signal or signals delivered to the electrodes of lens 10 using drive signal source 22. A temperature sensor 12 is provided that measures the temperature of the liquid crystal lens 10 in operation. The HRL and other elements of the lens 10 vary with temperature, and the drive signal is adjusted according to temperature. However, with the HRL provided as described above, stability of the core layer is provided, and initial calibration, for example as may be performed in the factory, can be used essentially for the lifetime of the camera 15. The sensor 12 thus gives a temperature measurement to the controller 20. In some cases, the camera 15 controls the operating temperature of the lens 10 using a heater to keep the temperature stable. In this case, the sensor is used for temperature control feedback.

The calibration circuit 30 can form a permanent part of camera 15 or it can be an external device used only at the time of initial calibration. In the case of an external device, the calibration circuit 30 can calibrate the lens 10 while still on a wafer, and thus without using the components 14, 16, 18 and 20 of the camera 15, and instead by using suitable equivalent components as part of the calibration instrument.

The calibration circuit 30 controls the optical power setting of an electric field controller to determine the relationship between the control signal and optical power and/or optical axis position of the lens (or other device, such as a beam steering device) as a function of temperature or at the stable operating temperature, as the case may be. This typically involves sweeping the drive signal through a range of values while a test pattern image obtained is recorded and analyzed. The result is to generate a setting value to be stored in the controller 20 of the camera.

What is claimed is:

1. A gradient-index liquid crystal optical device comprising: transparent substrates defining a gap between inner sides of the substrates;
   a liquid crystal material filling the gap;
   an alignment layer covering said substrates for orienting the liquid crystal material;
   electrodes supported by the inner sides of the substrates and structured to create a spatially non-uniform electric field in the gap;
   a highly resistive layer having a core weakly conductive material with an index of refraction higher than an index of refraction of the substrates and encapsulated by layers of a proximity material having insulating properties and an index of refraction between the index of refraction of the core weakly conductive material and the index of refraction of the substrates, the proximity material having substantially a same free energy of formation of oxide as the core weakly conductive material;
   wherein said core weakly conductive material comprises titanium oxide, and said proximity material comprises a layer of $Ta_2O_5$ on each side of the core weakly conductive material and a layer of $Al_2O_3$ on a side of the layer of $Ta_2O_5$ opposite to the core weakly conductive material.

2. The device as defined in claim 1, wherein said device comprises two said gaps filled with said liquid crystal material, said alignment layer covering said substrates so as to provide orthogonal orientations of said liquid crystal materials in said two gaps, said device being configured to act on both linear polarizations of light.

3. The device as defined in claim 1, further comprising drive circuitry connected to said electrodes and configured to provide a variable electrical signal to said electrodes to control an optical state of said device.

4. The device as defined in claim 3, wherein said drive circuitry is configured to define said variable electrical signal as a function of a desired optical state value, and to use one of: an initial and factory setting characterizing a resistance value of said highly resistive layer as a function of ambient temperature only without variation due to oxidation changes of the core weakly conductive material when determining said variable electrical signal as a function of said desired optical state value.

5. The device as defined in claim 1, wherein said device is a variable optical power lens.

6. The device as defined in claim 1, wherein said device is a variable optical axis position lens.

7. A method of manufacturing a gradient-index liquid crystal optical device, the method comprising:
   providing transparent substrates;
   depositing on a first one of said substrates:

at least one electrode structured to create a spatially non-uniform electric field between the substrates; and a plurality of layers forming a highly resistive layer having a core weakly conductive material with an index of refraction higher than an index of refraction of the substrates and encapsulated by layers of a proximity material having insulating properties and an index of refraction between the index of refraction of the core weakly conductive material and the index of refraction of the substrates, the proximity material having substantially a same free energy of formation of oxide as the core weakly conductive material, wherein said plurality of layers are deposited first onto said first one of said substrates, or at least one of said at least one electrode is deposited first onto said first one of said substrate;

depositing at least one electrode on a second one of said substrates;

providing an alignment layer covering said substrates for orienting the liquid crystal material;

providing at least one cell wall on said substrates;

depositing a liquid crystal material on one of said substrates in said cell wall;

covering said one of said substrates with said second one of said substrates to enclose said liquid crystal material within said cell wall; and bonding said substrates together;

wherein said core weakly conductive material comprises titanium oxide, and said proximity material comprises a layer of $Ta_2O_5$ on each side of the core weakly conductive material and a layer of $Al_2O_3$ on a side of the layer of $Ta_2O_5$ opposite to the core weakly conductive material.

8. The method of manufacturing a gradient-index liquid crystal optical device as defined in claim 7, wherein said transparent substrates are prepared for an array of devices to be manufactured by wafer-scale fabrication, wherein an array of said cell walls are provided on said substrates, said depositing of said liquid crystal material is performed for each one of bottom barriers, and further comprising singulating individual devices from a resulting wafer comprising said substrates.

9. The method of manufacturing a gradient-index liquid crystal optical device as claimed in claim 7, wherein said devices each comprise two liquid crystal cells, wherein a first one of said cells has liquid crystal oriented in a first linear direction, and a second one of said cells has liquid crystal oriented in a second linear direction orthogonal to said first linear direction, said device acting on both linear polarizations of light.

* * * * *